United States Patent [19]

Henoch

[11] 4,217,549
[45] Aug. 12, 1980

[54] DEVICE FOR TWO-WAY INFORMATION LINK

[75] Inventor: Bengt Henoch, Hägersten, Sweden

[73] Assignee: Stiftelsen Institutet for Mikrovagsteknik vid Tekniska Hogskolan i Stockholm, Stockholm, Sweden

[21] Appl. No.: 831,988

[22] Filed: Sep. 9, 1977

[30] Foreign Application Priority Data

Sep. 24, 1976 [SE] Sweden .................................. 7610604

[51] Int. Cl.² ........................ H04B 7/00; H01Q 13/00
[52] U.S. Cl. ................................ 455/81; 343/100 PE; 343/786
[58] Field of Search ................. 343/100 PE, 175, 176, 343/177, 178, 100 TD, 786, 775, 779; 325/24

[56] References Cited

U.S. PATENT DOCUMENTS

| 3,789,406 | 1/1974 | Wernli | 343/100 PE |
| 3,810,182 | 5/1974 | White et al. | 325/22 |
| 3,916,414 | 10/1975 | Trigon et al. | 343/779 |
| 3,938,158 | 2/1976 | Birch et al. | 343/786 |

Primary Examiner—Robert L. Griffin
Assistant Examiner—Edward L. Coles
Attorney, Agent, or Firm—Le Blanc, Nolan, Shur & Nies

[57] ABSTRACT

This invention relates to a device for a two-way information link, where a first one of two units or both units are intended to transmit an interrogation signal to the second unit, and the second unit is capable to transmit a response to the first unit.

4 Claims, 5 Drawing Figures

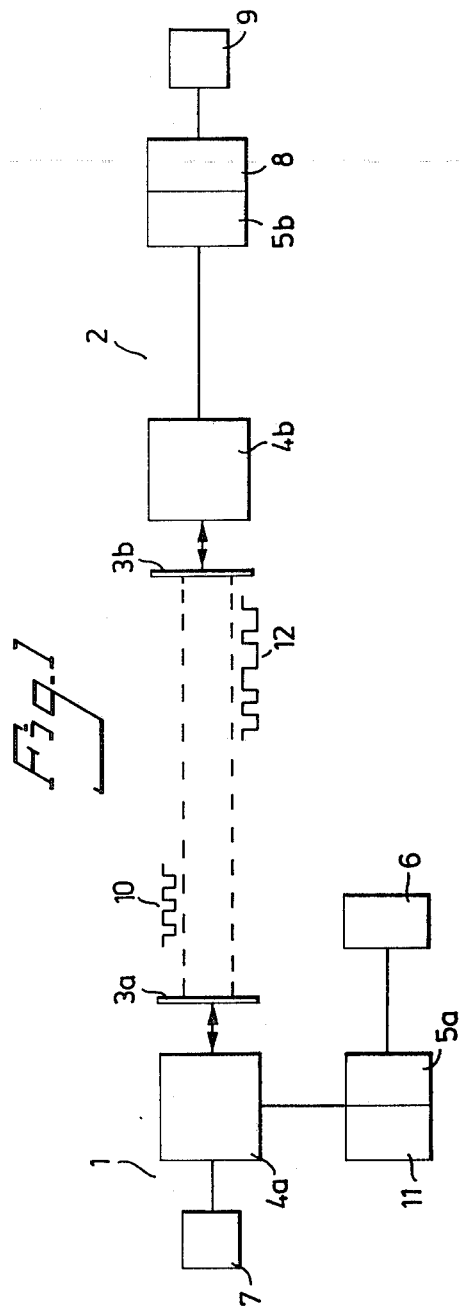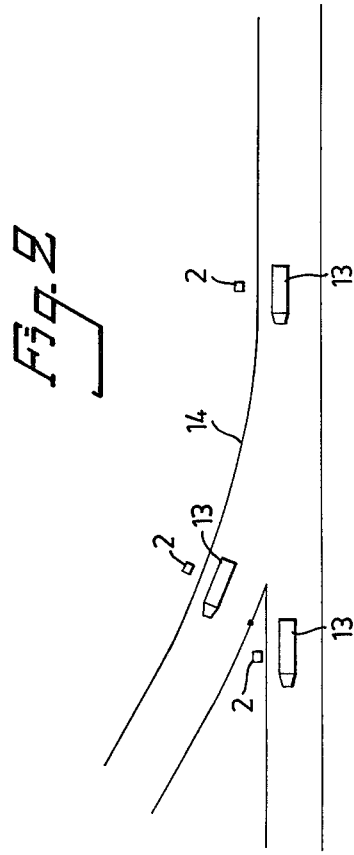

DEVICE FOR TWO-WAY INFORMATION LINK

BACKGROUND OF THE INVENTION

It is previously known to arrange two units in the aforedescribed way. In known systems, however, transmitter and receiver are separated when they are tuned on the same frequency. When transmitter and receiver are assembled and have one aerial in common, the transmitter and receiver are tuned on different frequencies. Known devices for a two-way information link have in common, that they are relatively complicated.

SUMMARY OF THE INVENTION

The present invention offers a very simple device for a two-way information link which comprises at least two units, each of which includes a transmitter and a receiver, and each unit is capable to transmit and receive information.

The invention is characterized thereby, that each unit is capable to transmit and receive, respectively, waves of mutually substantially equal frequency which are orthogonal relative to each other, and each unit is so arranged that at transmitting and receiving, respectively, said waves the transmitting element and the receiving element do not affect each other.

BRIEF DESCRIPTION OF THE DRAWINGS

The invention is described in greater detail in the following, with reference to the accompanying drawings, in which FIG. 1 shows a system for a two-way information link with the invention applied therein, FIG. 2 shows a road section where the invention is applied, FIGS. 3a&b show a device according to a first embodiment of the invention.

DESCRIPTION OF THE PREFERRED EMBODIMENTS

Figure 3A:
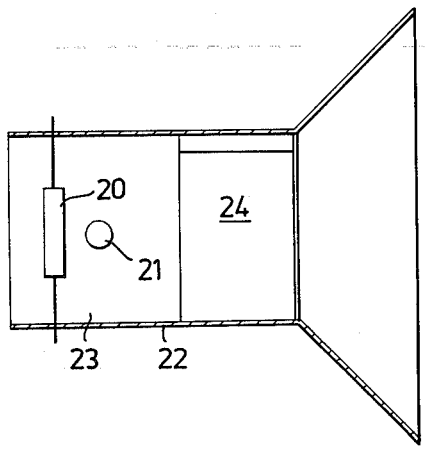

In FIG. 1 a recording unit 1 is shown, which is assumed to be the interrogating unit, and a recording emitter 2, which is assumed to be the responding unit. In many cases, however, it is advantageous to design said two units identical or almost identical in order to obtain a two-way information flow of all kind occurring in the system.

The recording unit 1 comprises an aerial 3a, a transmitter and receiver 4a, a decoding device 5a and a device for e.g. storing, print-recording or transmitting the result to a central unit. A starting device 7 is provided for starting the transmitter 4a automatically or manually. The recording emitter 2 also comprises an aerial 3b and a transmitter and receiver 4b, which are identical with the aerial 3a and the transmitter and receiver 4a of the recording unit 1. The recording emitter further comprises a decoding device 5b of the same kind as comprised in the recording unit 1. A coding device 8 is provided in the recording emitter 2 and capable to generate a coded signal to be transmitted from the transmitter 4b, in which signal the code is the information, which the recording emitter 2 is intended to emit. This information, of course, may be of a very great variety of types, depending on the connection in which the two-way information link is used. An information unit 9 is connected to the coding device 8 and contains the value or values, digits etc. to be transferred to the recording unit 1 upon an interrogation therefrom. The information unit 9, thus, is capable to control the coding device so that the coding device codes a signal in agreement with the information to be transmitted.

The recording unit and the recording emitter operate briefly as follows. The starting device 7 sends an impulse to the transmitter 4a to transmit a signal via the aerial 3a. The transmitter 4a hereby generates an interrogation signal of a fixed frequency. This signal either may be continuous or consist of a pulse train 10 of such a shape that the signal is coded by having on-off character, and the code of the signal expresses which information the recording unit 1 wants to receive from the recording emitter 2. A coded signal corresponding to the interrogation, to which the recording unit 1 wants a response by the recording emitter 2, is obtained thereby that a coding device 11 in the recording unit 1 controls the transmitter so that the transmitter generates said coded signal 10. The interrogation signal, thus, is transmitted by the aerial 3a and received by the aerial 3b of the recording emitter.

The recording emitter 2 is capable upon receipt of an interrogation signal to shift from a "stand-by" position to an operative position. The recording emitter 2, thus, does not consume energy while in "stand-by" position, as is previously known.

Upon receipt of the interrogation signal in the recording emitter 2, the emitter switches to the operative position.

The signal from the aerial 3b is received in the receiver 4b and decoded in the decoding device 5b, which is of a suitable known type. By guidance of the decoded information in the interrogation signal directed to the information unit 9, the information unit 9 emits a signal to a coding device 8 of a suitable known type, which signal corresponds to the value, digit etc. after which the recording unit 1 had interrogated. The information unit 9 also may be of a suitable known type. The coding device 8 is capable to control the transmitter 4b in such a manner, that the transmitter generates a signal of fixed frequency, which signal 12 consists of a pulse train so shaped that the signal is coded by having on-off character. The fixed frequency is the same as the fixed frequency generated by the transmitter 4 of the recording unit.

Said signal 12 is emitted from the aerial 3b, after which emittance the recording emitter 2 reassumes stand-by position.

Said lastmentioned signal 12 is received by the aerial 3a and receiver 4a in the recording unit 1. The signal received is decoded in a decoding device 5a of the same type as mentioned above, whereafter the decoded signal is stored in a device 6, for example by means of known memory units. The device 6, as mentioned above, further comprises means, for example for print-recording the information in the signal 12 emitted from the recording emitter and/or transmitting said information further to a central station. After the information has been processed in said device 6, the recording unit 1 assumes "stand-by" position until the starting device 7 again actuates the transmitter 4.

It is apparent to everybody, that a system corresponding to the one described above can be utilized for a great number of purposes, such as information transfer of data concerning, for example, water pressure, temperature, flow, weight etc. between two or more objects movable relative to each other.

A special application of this system is the recording of objects as described in our Swedish patent applications Nos. 7503620-2 and 7503621-0.

When the recording emitter 2 is positioned stationary along a road 14, as shown in FIG. 2, and the recording unit 1 is positioned in a vehicle 13, the recording emitter 2 then can give information on road choice and rainfall, temperature, winds, road repairs etc. farther ahead on the road on which the vehicle is driving. In such a case, the interrogation signal emitted from the recording unit 1 may also contain an identification code for the interrogating vehicle, which code can be transmitted further by the recording emitter 2 to a central unit for processing. The recording emitter 2 further may receive information from a central unit, which information also is stored in the information unit 9.

Known devices for a two-way information link, as already mentioned, are relatively complicated, for example, as concerns the aerials, where several frequencies must be used in order to prevent the receiver and transmitter from affecting one another. The present invention offers a device, at which the same frequency is used for the interrogation signal as well as the response signal, and where transmitter and receiver do not affect each other, because the signal generated by the active transmitter element is transformed so that the aerials emit waves of a special nature which are transformed before they arrive at the active receiver element.

Figure 3B:
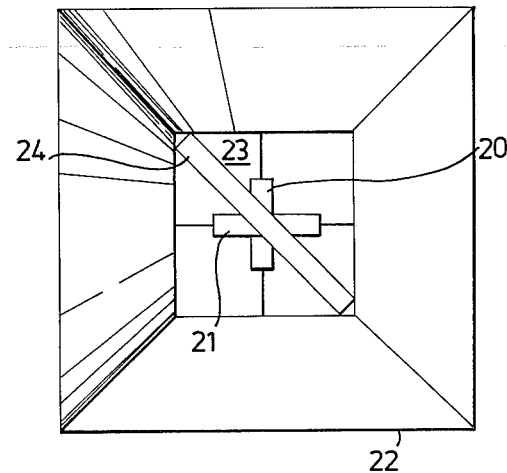

In FIGS. 3a and 3b a device according to a first embodiment of the invention is shown. In FIG. 3a the device is shown by way of a section seen from the side, and in FIG. 3b seen straight from ahead.

FIGS. 3a, 3b show the active oscillation element of the transmitter which consists of a transmitter diode 20, and the active receiving element of the receiver which consists of a receiver diode 21, both of which are positioned in the rearward space 23 of a waveguide funnel 22 common for transmission and receiving and connected to suitable electric circuits (not shown). The diodes 20, 21 are positioned perpendicularly in relation to each other in a plane perpendicular to the wave propagation direction of a transmitted or received wave. As a consequence thereof, the transmitter diode 20 and receiver diode 21, respectively, transmit and receive, respectively, waves which are plane polarized each in one of two planes perpendicular to each other, in such a manner, that said elements do not affect each other.

The waveguide funnel 22 and the diodes 20, 21 are of a suitable known design.

A means is provided for dividing said plane polarized signal generated from the transmitter diode into two orthogonal waves, one of which preferably is dephased 90° in relation to the other wave, i.e. so that a circular polarized wave is produced and transmitted from the aerial. Said means transforms in the same way a received corresponding wave system to a plane polarized wave by dephasing one of the orthogonal waves in relation to the other wave, so that these waves will be in phase. The plane polarized wave thus obtained then is located in the plane, in which the receiver diode 21 is located.

The units 1, 2 further are of such a nature, due to the location of the diodes 20, 21 relative to each other and to said means, that two units 1, 2 directed toward each other are capable to transmit each a circular polarized wave of such a nature, that the wave from one unit has a direction of rotation opposite to the direction of rotation of the wave from the second unit, seen in a direction from one of the units to the other unit.

When observing two units, said means, thus, brings about the effect that, when the transmitter element 20, 30 in each unit 1, 2 emits a signal, this signal is transformed to a wave system 10, which is orthogonal to a corresponding wave system 12 received by the same unit 1, 2, and which said means 23, 24 also is capable to transform to a signal directed to the receiving element of the same unit 1,2.

Said means consists of a plane plate 24 of a dielectric material. The plate 24 is located in said wave guide funnel 22 ahead of the diodes 20, 21 and positioned 45° to the two polarization planes and in parallel with the wave propagation direction of the transmitter.

The transmitting diode 20 of one of two units, thus, generates a plane polarized wave in the plane, in which the diode 20 is located, which wave when passing the plate 24 is transformed to a circular polarized wave, which is transmitted. This wave is received by the second one of the two units. The circular polarized wave when passing the plate 24 thereof is transformed to a plane polarized wave in the plane, in which its receiver diode is located. To achieve this, the diodes 20, 21, for example, in two units directed to each other can be positioned equally, and the two plates 24 be located in the same plane when the transmitter diodes and the receiver diodes, respectively, are located in the same plane. The aforedescribed device, thus, comprises the transmitter and receiver 4a, 4b and the aerial 3a, 3b in one unit, where the transmitter diode 20 and the receiver diode 21 do not affect each other during the transmission or receiving operation, because at transmission and receiving, respectively, they are only connected each to one of two planes perpendicular relative to each other.

The device, thus, is very simple and shows the special advantages, that the aerial as well as the electric circuits coupled to the diodes can be designed tuned on the same frequency with respect to transmitting and receiving. A further very essential advantage is, that the mutual relation of rotation between two units directed to each other is of no importance for transmitting or receiving, because the waves existing between the units are circular polarized. This advantage is particularly valuable when information is to be exchanged between two units with unknown mutual relation of rotation.

One example thereof is a crane hook associated with a crane where a recording unit is positioned stationary in relation to the jib and a recording emitter is stationary attached to the crane hook, which is rotated in relation to the jib by action a.o. of the load. At this example, information concerning the load weight in question is fed via a wire strain gauge on the crane hook to the information unit 9. The recording unit then interrogates the recording emitter at suitable times on the load weight in question, and the emitter emits a response signal to the recording unit.

Figure 4:
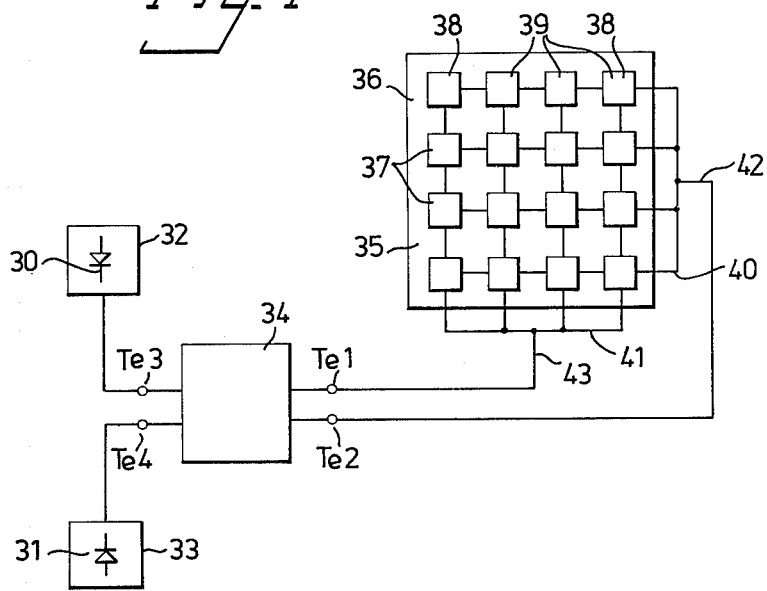
FIG. 4 shows a device according to a second embodiment of the invention.

A second embodiment according to the invention for the transmitter and receiver 4 and the aerial 3 is shown in FIG. 4. At this embodiment the active oscillation element of the transmitter consists of a transmitter diode 30, and the active receiving element of the receiver consists of a receiver diode 31 positioned in electric circuits 32, 33 to generate a.o. the effect required for transmission.

A hybride 34 is provided, which preferably is a so-called 3dB hybride. The hybride comprises four connection terminals, of which two, Te1 and Te2, are connected to an aerial 35 common for transmitting and receiving, and one terminal, Te3, is connected to the transmitter diode 30, and one terminal, Te4, is connected to the receiver diode 31.

The hybride 34 at this embodiment constitutes said means for dividing the signal generated by the transmitter diode into two signals, which are emitted as two orthogonal waves, and for transforming a received corresponding wave system to a signal emitted to the receiving unit. The hybride is of such a nature, that a signal generated by the transmitter diode 30 and fed in at the terminal Te3 is divided into two signals dephased by 90°, of which signals one is fed out at the terminal Te3 and the other one at the terminal Te2. The terminal Te4 then is dead. Inversely, upon receiving, a first signal is fed in from the aerial 35 at the terminal Te1, and a second signal dephased 90° relative to the first signal is fed in at the terminal Te2. One or both of these signals are phase turned in the hybride 34, so that the two signals are given the same phase, whereafter they are fed out at the terminal Te4 while the terminal Te3 is dead. The hybride 34, thus, causes at transmission two signals be fed to the aerial 35. Said aerial 35 is a per se known mat 36 of electrically non-conductive material provided with electrically conductive elements 39 arranged in spaced relationship in rows 37 and columns 38. Said elements are row-wise and column-wise electrically connected to electric conductors. All rows, besides, are interconnected along two sides perpendicular to each other, and all columns are interconnected by conductors 40 and 41, respectively. Each conductor 40, 41 is provided on its centre with a tap 42 and 43, respectively, which form an input or output for a high-frequency signal emitted or received by the aerial. When a signal is applied only to one of the two inputs, a plane polarized wave is emitted with an orientation, which is in parallel with the rows 37 when the output 42 is used, and which is in parallel with the columns 38 when the output 43 is used.

The signals thus fed from the hybride 34 with a phase-shifting of 90°, but with the same frequency, are fed in at the inputs 43 and 42, respectively. Owing to the fact that the signals are of the same frequency and dephased 90° relative to each other, a circular polarized wave is emitted from the aerial which, thus, consists of two orthogonal waves.

Inversely, when such a wave system is to be received, the aerial 35 reacts inversely, because it is sensitive in two directions, so that the aerial divides a received circular polarized wave into two orthogonal components having the same frequency but dephased 90° relative to each other. One of these components is fed out as signal at output 42, and the other component at output 43. The hybride 34, as mentioned above, is of such a nature that only one wave is fed out at the terminal Te4, i.e. to the receiver diode 31.

As described above in connection with the first embodiment, also the units according to the embodiment described last are of such a nature, resulting from the design of the hybride 34 in relation to the location of the diodes 30, 31, that two units 1, 2 directed to each other are capable to emit each a circular polarized wave of such a nature, that the wave from one unit has a direction of rotation opposite to the direction of rotation from the second unit, seen in a direction from one of the units to the other one.

According to this embodiment of the invention, thus, it also is achieved that the waves emitted and received, respectively, are mutually orthogonal, and the device is of such a nature that at transmission and receiving, respectively, the transmitting element and the receiving element do not affect each other.

The device described, thus, comprises the transmitter and receiver 4a, 4b and the aerial 3a, 3b. The advantages of the device according to the second embodiment are in agreement with the advantages explained above concerning the first embodiment, with respect to that the transmitting and the receiving element do not affect each other, and with respect to the simplicity and use of the device.

The invention must not be regarded restricted to the embodiment described and shown and to their structures, because they can be altered within their scope defined in the attached claims.

I claim:

1. A device for a two-way information link, comprising at least two units (1, 2), each including transmitter and receiver means for transmitting and receiving information, characterized in that said means in each unit (1, 2) includes (a) transmitting and receiving elements (20, 21) arranged to respectively emit and receive substantially equal frequency, orthogonally related waves without affecting each other, and (b) wave transformation means (24, 34) (i) for transforming the wave emitted by said transmitting element into a transmit wave system (10) that is propagated from said transmitter and receiver means in orthogonal relation to a corresponding wave system (12) arriving at said transmitter and receiver means for reception and (ii) further for transforming said corresponding wave system into a wave that is directed to and receivable by said receiving element, the wave systems (10, 12) propagated by the transmitter and receiver means of the two units (1, 2) being of at least substantially equal frequency, the transmit wave system (10, 12) provided by said wave transformation means in each of said units (1, 2) being a circular polarized wave, the polarization of the circular waves provided by said units (1, 2) being opposite to one another as seen from one of said units (1, 2), the transmitting element in each unit (1, 2) being a transmitter diode (30), and the receiving element in each unit (1, 2) being a receiver diode (31) connected to an aerial (35), said aerial (35) comprising a mat (36) formed from electrically non-conductive material and provided with electric conductive elements, which are arranged in rows (37) and columns (38), spaced from but electrically connected to each other.

2. A device according to claim 1, characterized in that said wave transformation means (34) comprises a hybrid, which is connected between the elements (30, 31) and said aerial (35), so that one element (30) is connected to one (Te3) of four terminals on said hybrid (34) and the second element (31) is connected to a second one (Te4) of said four terminals, and the two remaining terminals (Te1, Te2) from said hybrid (34) are connected to said aerial (35).

3. A device according to claim 2, characterized in that the hybid (34) is effective to divide a signal generated from the transmitting element (30) with one frequency into two signals having the same frequency as said one frequency, which two signals are dephased 90° relative to each other and occur each at one of said remaining two terminals (Te1, Te2) of the hybrid, said aerial (35) being effective to radiate circular polarized waves, and the aerial (35) upon receiving circular polarized waves developing two incoming signals dephased 90° relative to each other, which are fed to said remaining two terminals (Te1, Te2) of the hybrid, said hybrid being effective to dephase the incoming signals by 90° relative to each other, so that the dephasing 0° occurs between the waves, to provide a resulting signal that is applied to said receiving element (31) via said second one of said terminals.

4. A device for a two-way information link, comprising at least two units (1, 2), each including transmitter and receiver means for transmitting and receiving information, characterized in that said means in each unit (1, 2) includes (a) a waveguide funnel (22) common for transmitting and receiving, (b) transmitting and receiving diodes (20, 21) arranged in a rearward space of said waveguide funnel (22) to respectively emit and receive substantially equal frequency, orthogonally related waves without affecting each other, and (c) wave transformation means (24, 34) (i) for transforming the wave emitted by said transmitting diode (20) into a transmit wave system (10) that is propagated from said transmitter and receiver means in orthogonal relation to a corresponding wave system (12) arriving at said transmitter and receiver means for reception and (ii) further for transforming said corresponding wave system into a wave that is directed to and receivable by said receiving diode (21), said transmitter and receiver diodes (20, 21) being arranged perpendicularly to each other in a plane perpendicular to the wave propagation direction of a transmitted or received wave, said receiver diode (21) providing for the reception of a plane polarized wave in a first plane, and said transmitter diode (20) providing for the transmission of a plane polarized wave in a second plane normal to said first plane, said wave transformation means comprising a plane plate (24) of a dielectric material located in said waveguide funnel (22) ahead of said diodes (20, 21) and positioned at an angle of 45° with respect to said planes in parallel with the transmitted wave propagation direction, the wave systems (10, 12) propagated by the transmitter and receiver means of the two units (1, 2) being of at least substantially equal frequency, the wave system (10, 12) provided by said wave transformation means in each of said units (1, 2) being a circular polarized wave, the polarization of the circular waves provided by said units (1, 2) being opposite to one another as seen from one of said units (1, 2).

* * * * *